United States Patent
Chandrasekaran et al.

(10) Patent No.: US 7,549,017 B2
(45) Date of Patent: Jun. 16, 2009

(54) METHODS AND APPARATUS FOR SELECTING A VIRTUALIZATION ENGINE

(75) Inventors: Varagur V. Chandrasekaran, Fremont, CA (US); Sachin Jain, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 487 days.

(21) Appl. No.: 11/370,643

(22) Filed: Mar. 7, 2006

(65) Prior Publication Data

US 2007/0214315 A1      Sep. 13, 2007

(51) Int. Cl.
*G06F 12/02* (2006.01)
(52) U.S. Cl. ..................... 711/114; 711/170
(58) Field of Classification Search .......... 711/114
See application file for complete search history.

(56) References Cited

U.S. PATENT DOCUMENTS

| | | | |
|---|---|---|---|
| 6,249,802 B1 | 6/2001 | Richardson et al. | |
| 6,532,212 B1* | 3/2003 | Soloway et al. | 370/230 |
| 6,948,044 B1 | 9/2005 | Chandrasekaran | |
| 2003/0131182 A1* | 7/2003 | Kumar et al. | 711/5 |
| 2006/0112251 A1* | 5/2006 | Karr et al. | 711/170 |
| 2006/0259680 A1 | 11/2006 | Chandrasekaran | |
| 2008/0028143 A1* | 1/2008 | Murase | 711/114 |

OTHER PUBLICATIONS

Virtualization Solutions, Executive Brief, "Make it Simple, Virtualization Solutions Help Take the Cost and Complexity out of IT Infrastructure," IBM, Jan. 2005, 16 pages.
"Simplify Provisioning via Network-based Storage Virtualization," printed from www.incipient.com/products/provision.htm on Jul. 14, 2006, 2 pages.
PCT, Notification of Transmittal of the International Search Report and the Written Opinion of the International Searching Authority, or The Declaration, Sep. 26, 2008. PCT/US 07/63262.

* cited by examiner

*Primary Examiner*—Hetul Patel
(74) *Attorney, Agent, or Firm*—Weaver Austin Villeneuve & Sampson LLP

(57) ABSTRACT

Methods and apparatus are provided for efficiently selecting virtualization engines in storage area networks. Initiators, targets, and candidate virtualization engines associated with a virtual logical unit number (VLUN) are identified and characteristics such as latency, network topology, load, and mirroring and striping characteristics are analyzed and used to efficiently select a virtualization engine for a particular VLUN in a storage area network. A virtualization engine can be implemented in a line card associated with a fibre channel switch.

23 Claims, 6 Drawing Sheets

METHODS AND APPARATUS FOR SELECTING A VIRTUALIZATION ENGINE

BACKGROUND OF THE INVENTION

1. Field of the Invention.

The present invention generally relates to Storage Area Networks (SANs). More specifically, the present invention provides techniques and mechanisms for selecting a virtualization engine in a SAN.

2. Description of Related Art

Virtualization is an abstraction that allows efficient use of resources in a manner transparent to a user. In many storage area networks, virtualization is provided at a host or at a target connected to a storage area network. For endpoint virtualization, a target device may include multiple physical disks that allow data written to the target device to be mirrored and striped across disks in a manner transparent to the host and the user. A host writes data to a disk array and the disk array is responsible for managing redundancy features in a manner transparent to the host. In another example, hosts may be responsible for implementing virtualization. Instead of having an end device perform the redundancy operations, a host can elect to mirror and stripe data across a variety of storage devices in a storage area network in a manner transparent to target devices and the user.

With the emergence of intelligent storage area networks, virtualization is being moved to the network. In some examples, fibre channel switches in a storage area network perform functions associated mirroring and striping in a manner transparent to the hosts and end devices. However, mechanisms for efficiently and effectively configuring virtualization mechanisms are limited in storage area networks. It is often difficult to efficiently select a virtualization engines in a storage area network.

It is therefore desirable to provide methods and apparatus for efficiently selecting virtualization engines in a storage area network using virtualization.

SUMMARY OF THE INVENTION

Methods and apparatus are provided for efficiently selecting virtualization engines in storage area networks. Initiators, targets, and candidate virtualization engines associated with a virtual logical unit number (VLUN) are identified and characteristics such as latency, network topology, load, and mirroring and striping characteristics are analyzed and used to efficiently select a virtualization engine for a particular VLUN in a storage area network. A virtualization engine can be implemented in a line card associated with a fibre channel switch.

In one embodiment, a technique for selecting a network based virtualization engine is provided. Topology information for a storage area network is received. The storage area network is associated with a virtual logical unit number (VLUN) including multiple host initiators, multiple targets, and multiple candidate virtualization engines. Latency characteristics for performing input/output IO operations between the multiple host initiators and the multiple targets using the candidate virtualization engines are determined. Mirroring and striping characteristics associated with the VLUN are determined. A virtualization engine is selected from the multiple candidate virtualization engines for the VLUN based on the average latency and the mirroring and striping characteristics.

In another embodiment, a system for selecting a network based virtualization engine is provided. The system includes an interface and a processor. The interface is operable to receive topology information for a storage area network. The storage area network is associated with a virtual logical unit number (VLUN) including a multiple host initiators, a multiple targets, and a multiple candidate virtualization engines. The processor is operable to determine latency characteristics for performing input/output IO operations between the multiple host initiators and the multiple targets using the candidate virtualization engines and determine mirroring and striping characteristics associated with the VLUN. The processor selects a virtualization engine from the multiple candidate virtualization engines for the VLUN based on the average latency and the mirroring and striping characteristics.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
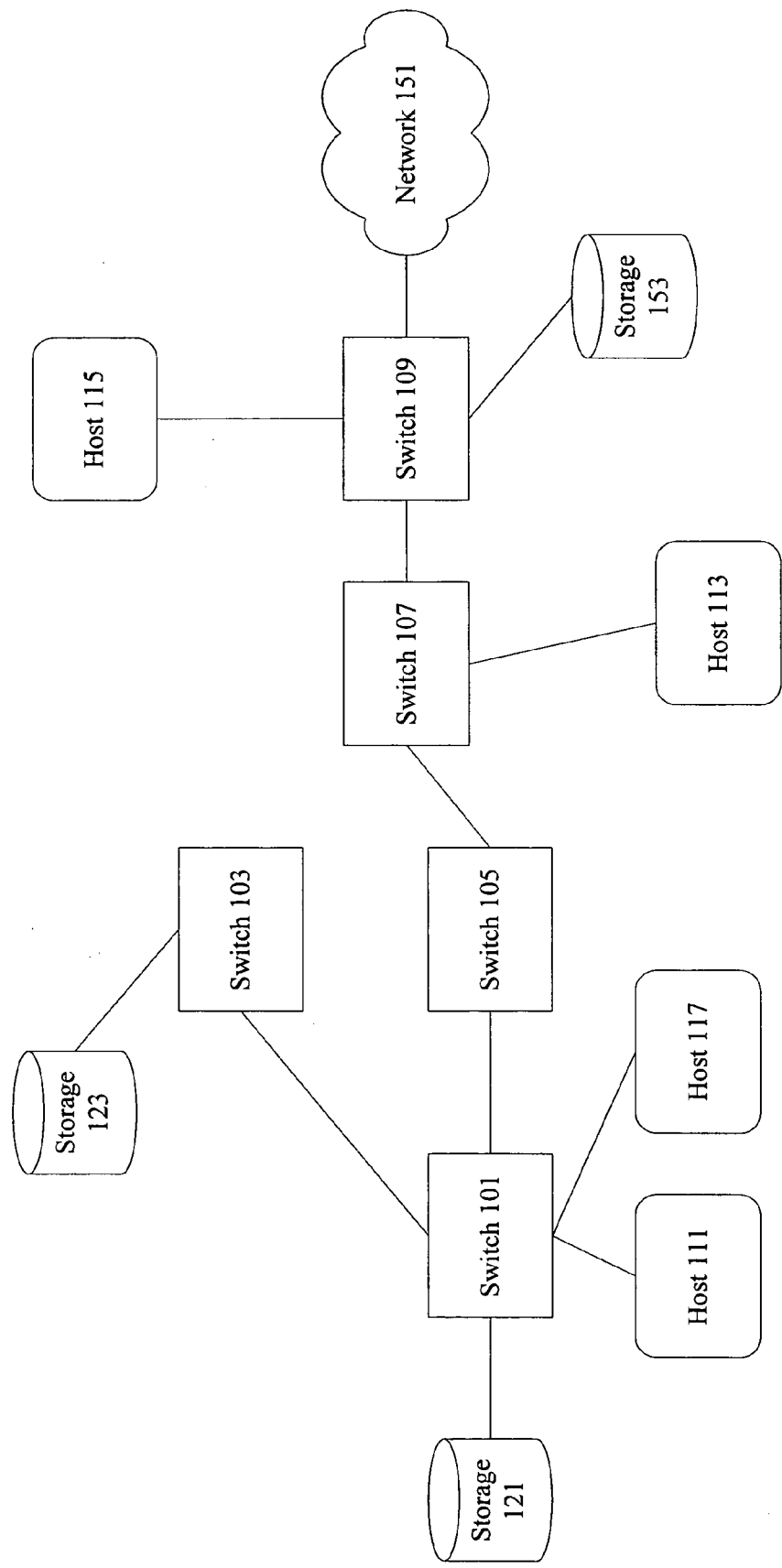
FIG. 1 is a diagrammatic representation showing a storage area network.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Virtualization is an abstraction that allows efficient use of resources in a manner transparent to a user. In fibre channel networks, virtualization has conventionally been implemented at targets and at hosts. For example, a disk array would be responsible for striping and mirroring data across multiple disks. In another example, a host would provide for volume management and convert a single input/output (I/O) request into one or more requests for mirroring and striping to multiple disks.

Typical virtualization schemes such as those implemented at a host or at a target allow a controller to stripe and mirror data across multiple disks based on physical media characteristics such as disk speed and physical media size. However, host based and target based virtualization schemes may be expensive, inefficient, and may not use all available resources in a storage area network. Network based virtualization increases efficiency and allows implementation of virtualization in a manner transparent to both hosts and targets. A host makes an I/O request to a target and one or more virtualization engines in a network automatically perform mirroring, striping, and address mapping to allow data to be stored and retrieved from multiple targets.

A storage area network uses logical unit numbers (LUNs) to distinguish between storage resources. For example, users can determine whether a LUN is a disk drive, a number of disk drives, or a partition on a disk drive. Virtual logical unit numbers (VLUNs) allow more efficient organization of storage resources. Any set of resources used for storage in a storage area network is referred to herein as storage resources. According to various embodiments, storage resources include disk drives, portions of disk drives, or a partition of some physical storage media. In one example, storage resources are VLUNs. For example, a VLUN can be made up of complex Redundant Array of Independent Disks (RAID) layouts and even span across heterogeneous storage. VLUNs provide a convenient mechanism for more efficiently and intelligently allocating storage in order to increase data availability and data access performance.

According to various embodiments, hosts continue to make I/O requests as though they have a direct connection to physical disks. Targets such as disk arrays respond as though they have direct connections to hosts. It should be noted that a direct connection may include intervening routers and switches. The targets seen by hosts and the hosts seen by targets are virtual entities. The virtual to physical (V2P) mapping, mirroring, and striping are performed at virtualization engines included in a network virtualization scheme.

According to various embodiments, virtualization for a particular VLUN is controlled by a virtualization engine implemented by a processor in a fibre channel switch. In one embodiment, a virtualization engine includes multiple data path processors and associated resources in a fibre channel switch line card. The virtualization engine is responsible for handling transactions associated with a VLUN, including task management, data interlock, and virtual to physical lookup. In many instances, a virtualization engine handles transactions associated with multiple VLUNs.

A variety of switches in a network can be selected as a virtualization engine for particular VLUN. However, inefficiently selecting a virtualization engine can add latency to data I/O operations and inefficiently consume valuable network bandwidth. For example, an inefficiently selected virtualization engine may be one that is far from both the host and the target versus one that is close to both the host and the target. In situations where data is mirrored, an inefficiently selected virtualization engine may be one that requires transmitting a single copy of data along a short path and multiple copies of the data on long paths versus sending a single copy of data on a long path and multiple copies on short paths.

Furthermore, particular virtualization engines may get overburdened depending on data transmission characteristics. Disk accesses would then be slowed not because of bottleneck issues at storage resources but because of bottleneck issues at inefficiently selected virtualization engines. In one instance, if a bulk back up of data is being performed on a particular VLUN, buffer, memory, processor bandwidth, and TCAM resources are quickly consumed and the virtualization engine can no longer handle I/O operations for other I/O accesses. Consequently, the virtualization engines themselves become a bottleneck. One solution is to add additional virtualization engines into a storage area network or to have network administrators have a deep understanding of network topology and network characteristics. However, adding additional virtualization engines in a storage area network requires reconfiguration of hosts and targets or requires a level of network administrator sophistication and dedication that may not be possible.

Consequently, the techniques and mechanisms of the present invention provide techniques and mechanisms for intelligently and efficiently selecting virtualization engines. In one example, a virtualization engine for a VLUN is selected based on latency, distance, striping, mirroring, and load characteristics associated with various virtualization engines for transmissions between all hosts in the VLUN to all targets in the VLUN.

FIG. 1 is a diagrammatic representation of one example of a network that can use the techniques and mechanisms of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-ports. Non fabric-ports include interswitch ports (E-ports). Ports used to connect a switch to a host are referred to herein as fabric-ports (F-ports). In one example, E-ports are used to connect switch 105 to switch 107 while F-ports are used to connect switch 107 to host 113. Similarly, fabric loop-ports (FL-ports) are used to connect switch 103 to storage resource 123.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 123 and 153 may be fabric loops coupled respectively to switches 103 and 109 through FL-ports. The fabric loops typically include multiple storage devices. Any mechanism for connecting multiple storage devices that allows only access to a subset of devices at any point in time. In one example, a loop is a Small Computer Systems Interface (SCSI) loop that allows connection of 8 or 16 devices in a half-duplex framework.

Figure 2:
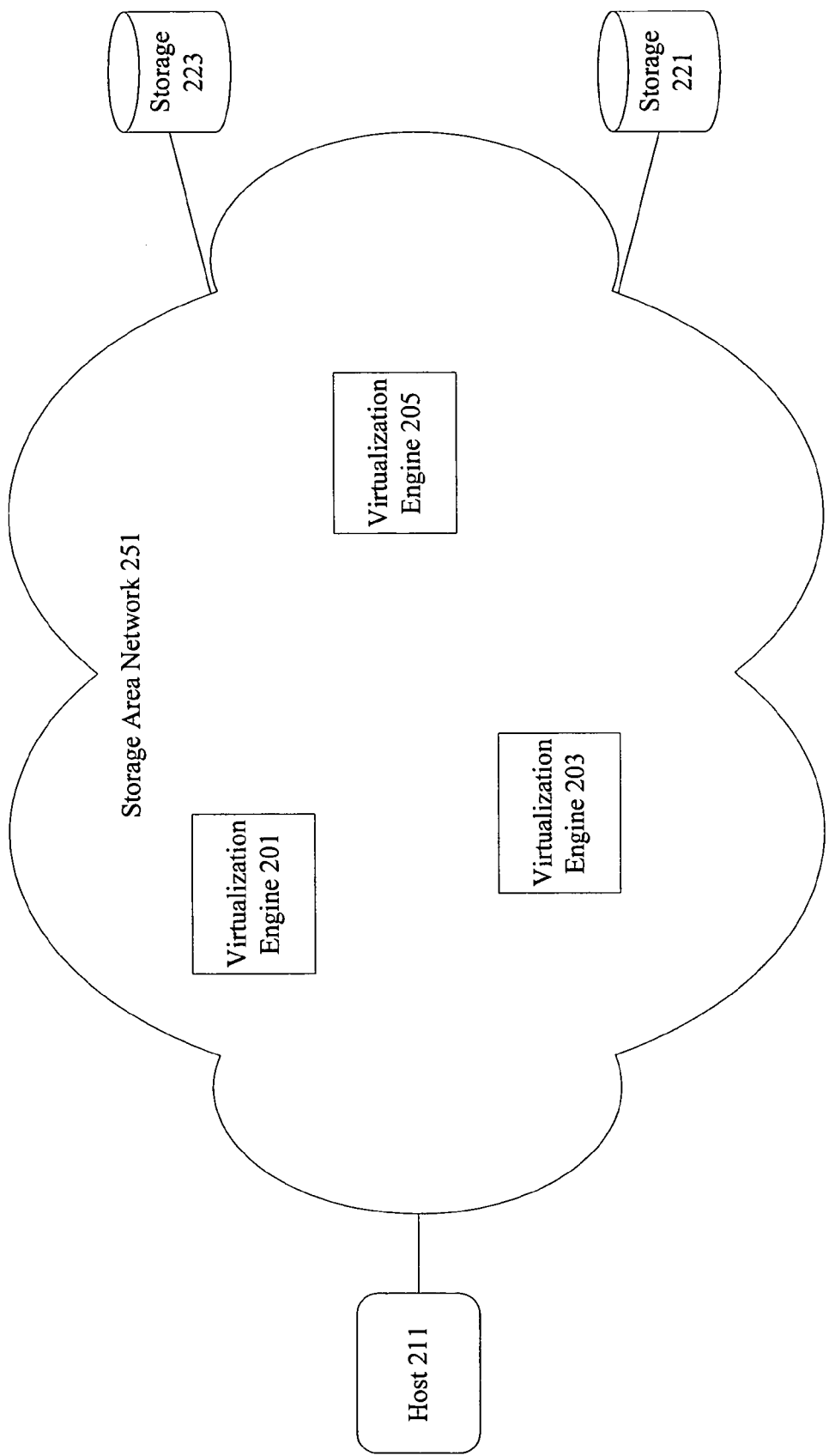
FIG. 2 is a diagrammatic representation showing a storage area network with multiple virtualization engines.

FIG. 2 is a diagrammatic representation showing a storage area network including multiple virtualization engines. A storage area network 251 includes virtualization engines 201, 203, and 205. A host 211 is connected to the storage area network 251. Storage devices 223 and 221 are also connected to the storage area network 251. According to various embodiments, a host 211 sends I/O requests that are handled by a particular virtualization engine such as virtualization engine 201. According to various embodiments, a host 211 sending a request to the virtualization engine 201 results in a virtualization engine 201 mirroring and striping a request to multiple storage resources, such as storage 223 and storage 221. Storage resources may be presented to a host 211 through a virtualization engine 201 by using VLUN or virtual enclosure ports (VEPs).

The virtualization engine 201 performs functions such as task management, interlock, virtual to physical (V2P) lookup, and also handles multipathing. Task management involves identifying tags associated with I/O requests to determine the type of task, such as simple tasks, high priority tasks, and ordered tasks. Data interlock allows the maintenance of data coherence at storage resources. V2P lookup maps virtual address ranges to physical address ranges. In one example, a virtual address range would be mapped to multiple physical address ranges to allow for mirroring. A virtual address range may also be split into multiple physical address ranges associated with multiple disks in order to allow striping. Multipathing involves handling multiple port accesses to the same VLUN. A virtualization engine 201 may be implemented using an intelligent linecard that includes datapath processors, cache, memory, and lookup tables.

Figure 3:
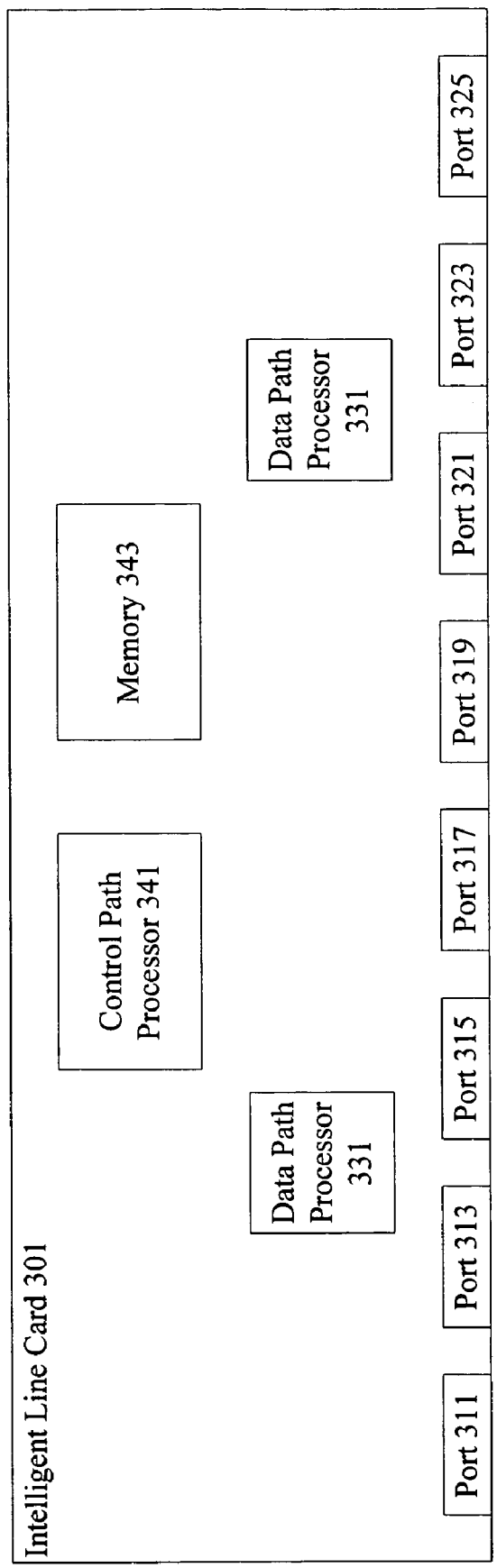
FIG. 3 is a diagrammatic representation showing an intelligent line card.

FIG. 3 is a diagrammatic representation of one example of an intelligent line card. According to various embodiments, the intelligent line card includes ports 311-325, data path processors 331 and 333, control path processor 341, and memory 343. Data path processors 331 and 333 are used to identify flow information and exchange information and output the data to the appropriate fibre channel switch port. The control path processor 341 is used to handle management functions and exceptions. Memory 343 can be used to hold statistical data gathered by a data path processor. In one embodiment, 8 data path processors are provided for 32 ports.

Although separate data path and control path processors are provided, it should be noted that in some instances, a single processor may be used to handle network traffic and control functions and exceptions. In other examples, additional processors may be provided. Any line card having hardware support for fibre channel packet snooping is referred to herein as an intelligent line card.

According to various embodiments, each data path processor operates as a virtualization engine in charge of one or more VLUNs. However, selecting the appropriate virtualization engine may be effective for a particular host and target, it is also necessary to consider latency, distance, load, striping, and mirroring characteristics associated with all other hosts, targets, and virtualization engines in the VLUN.

In another example, a data path processor 331 may be overloaded with operations associated with a first VLUN and may neglect transactions associated with a second VLUN. In order to prevent overload, virtualization engines are more intelligently selected.

For example, in the case of SCSI-Write, the host or initiator sends a copy of IO data to a virtual target associated with a virtualization engine. For the cases where VLUNs are mirrored, a virtual initiator associated with the virtualization engine has to send multiple copies of the same IO data to all targets applicable for that VLUN IO. This would consume a considerable amount of bandwidth if a virtualization engine and a resulting virtual target virtual initiator $\{VT, VI\}$ pair is not selected properly in the network. Also, the proper choice of a $\{VT, VI\}$ pair for a given VLUN in the network greatly influences the IO latency for that VLUN.

Typical network based virtualization solutions allow a network administrator to specify a virtualization engine explicitly. However, this burdens the network administrator with knowing unnecessary details about topology and network operation. The techniques of the present invention allow intelligent selection of a virtualization engine and a resulting $\{VT, VI\}$ pair.

Figure 4:
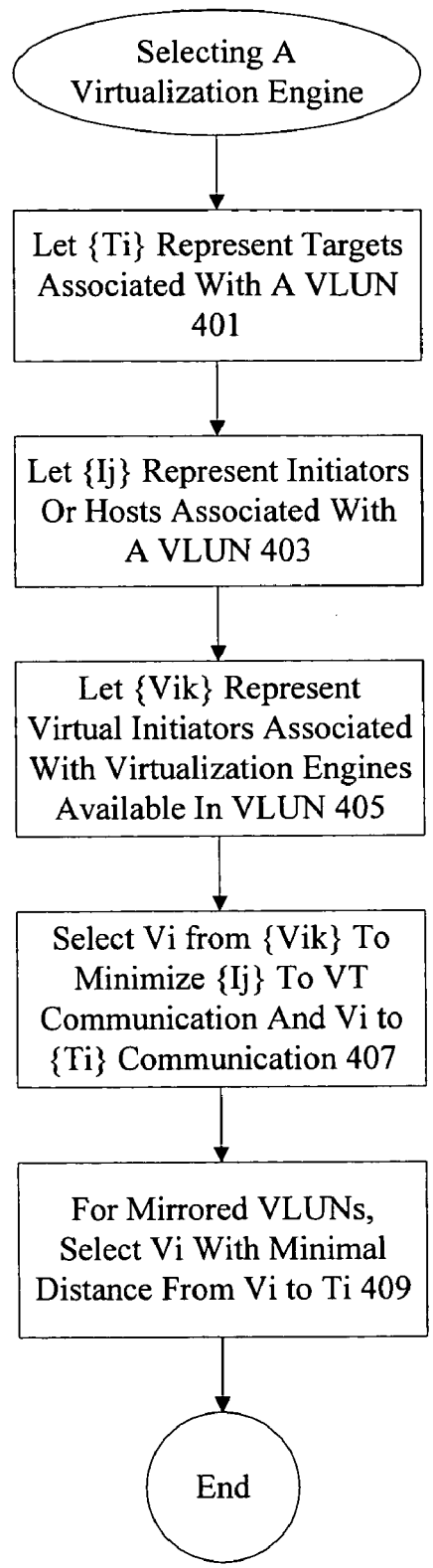
FIG. 4 is a process flow diagram showing a technique for selecting a virtualization engine.

FIG. 4 is a flow process diagram showing a technique for selecting a virtualization engine and associated virtual targets and virtual initiators. At 401, let $\{Ti\}$ represent the list of one or more targets that are associated with a given VLUN. At 403, let $\{Ij\}$ represent the list of one or more hosts or initiators that can access a particular VLUN. At 405, let $\{VIk\}$ represent the list of one or more virtual initiators associated with virtualization engines that are made available in the storage area network by way of intelligent line card ports.

At 407, the idea is to select a VI from $\{VIk\}$ to instantiate VT for the applicable VLUN such that the latency is reduced in terms of each $\{Ij\}$ to VT communication and VI to $\{Ti\}$ communication. At 409, for mirrored VLUNs, the choice of $\{VI, VT\}$ should be made such that a single copy of the IO data traverses an optimal distance between $\{Ij\}$ and VT, and multiple copies of write IO data traverse the least possible distance between VI and $\{Ti\}$. Storage area network bandwidth can be conserved in this manner.

Latency and distance information can be determined by consulting an FSPF database during $\{VT, VI\}$ or virtualization engine selection for a given VLUN. The FSPF database provides a view of the entire topology including how switches are connected and the cost associated with each link. Link cost is based on user configuration and/or on link speed by default. According to various embodiments, FSPF link cost is used as the measure of latency to allow computation of optimal paths and selection of a virtualization engine.

In one example, for each VI in $\{VIk\}$ one can find the sum of distances from VI to each member in $\{Ti\}$ and to each member in $\{Ij\}$. The VI with the least sum of distances is selected. This will give the virtualization engine which has the least average distance to the applicable initiators and targets with respect to a given VLUN.

If the metric should be to have the least average total distance between Ii and Tj, then we want VI with the minimum of the sum over all i,j of Distance(Ii, VI)+Distance(Vi, Tij)=#Targets(Sum of distance from VI to each member in $\{Ij\}$)+#Initiators(Sum of distance from VI to each member in $\{Ti\}$). A more complex metric can be devised for the case of mirroring by assuming the average number of targets on which mirroring is done. A Djikstra computation for a single node takes O(N*logN). Here we need k Djikstra computations so total time would be O(N*k log N). If N and k becomes very big this could start becoming prohibitive. But the above time intensive processing occurs only once during VLUN configuration time and should not be an overall concern.

Figure 5:
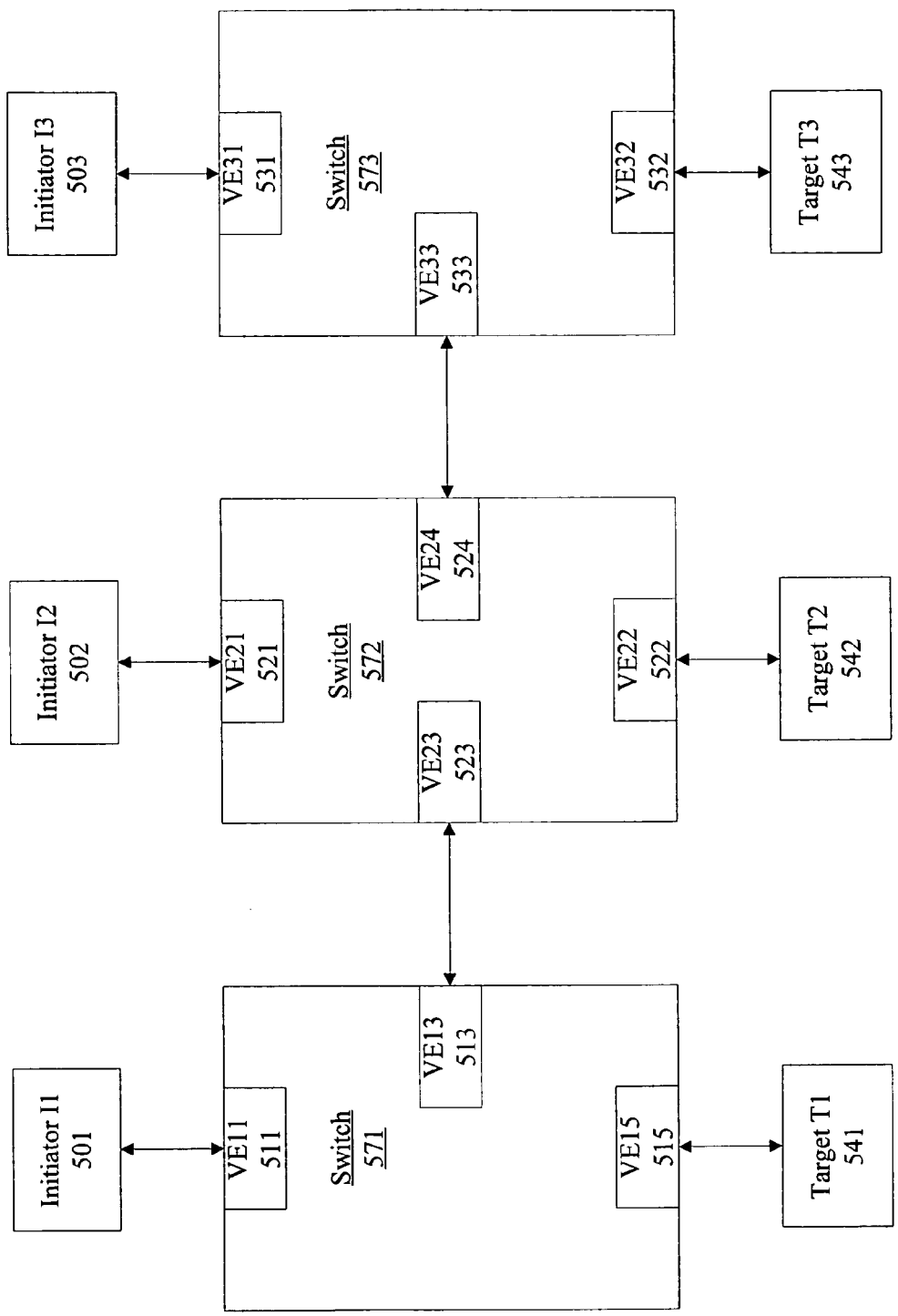
FIG. 5 is a diagrammatic representation showing initiators, targets, and candidate virtualization engines included in fibre channel switches.
Figure 6:
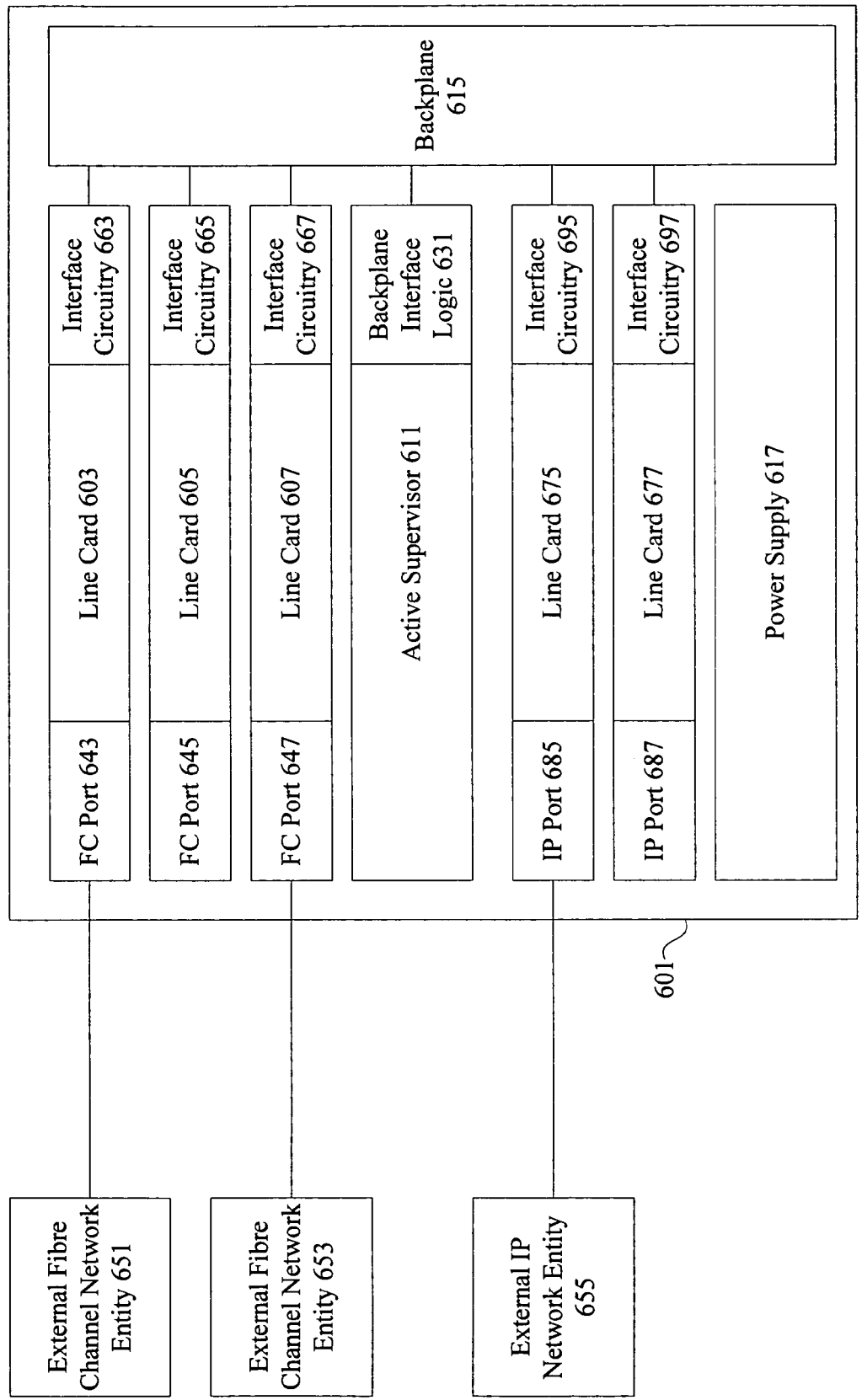
FIG. 6 is a diagrammatic representation showing a fibre channel switch.

FIG. 5 is a diagrammatic representation showing examples of virtualization engine selection. Initiators or hosts I1 501, I2 502, and I3 503 are connected to targets T1 541, T2 542, and T3 543 through fibre channel switches 571, 572, and 573. It should be noted that although only three switches are shown in this example, a storage area network can include a wide number of fibre channel switches and can include even fibre channel fabrics connected over other types of networks such as Internet Protocol or IP networks. It should also be noted that the initiators and targets could represent multiple initiators or targets. The fibre channel switches include multiple virtualization engines that can be selected for particular VLUNs. Switch 571 includes virtualization engines VE11 511. VE13 513, and VE15 515. Switch 572 includes virtualization engines VE21 521, VE23 523, VE24 524, and VE22 522. Switch 573 includes virtualization engines VE31 531, VE33 533, and VE32 532. According to various embodiments, VLUN layout plus FSPF cost is used in selecting the most optimal virtualization engine (VE) in the network to achieve the best possible performance with minimal latency for VLUN IO operations.

Virtualization engine load can also be taken into consideration while selecting a virtualization engine for a given VLUN, particular in cases where more than one optimal virtualization engine is available. In other words, a virtualization engine that is least busy in terms of {Num-of-VLUNs, IO-load-in-VLUNs} would be chosen for the current VLUN cases. The end-user can still be given a choice to manually specify virtualization engine selection for a given VLUN. In one example, seven VLUNs are configured in the networks using the LUNs available from the targets as follows:

VLUN-1: Carved out using LUNs from {T1}
VLUN-2: Carved out using LUNs from {T2}
VLUN-3: Carved out using LUNs from {T3}
VLUN-12: Carved out using LUNs from {T1, T2}
VLUN-23: Carved out using LUNs from {T2, T3}
VLUN-31: Carved out using LUNs from {T3, T1}
VLUN-123: Carved out using LUNs from {T1, T2, T3}

Each VLUN can be simple (i.e. no RAID, may involve concatenation), striped (i.e. RAID0 in one or more portions of VLUN), or mirrored (i.e. RAID1 in one or more portions of VLUN). For the given topology shown in FIG. 5, virtualization engines VE11 511, VE13 513, and VE15 515 in switch 571, virtualization engines VE21 521, VE23 523, VE24 524, and VE22 522 in switch 572, and virtualization engines VE31 531, VE33 533, and VE32 532 in switch 573 are all candidate virtualization engines. But all of them may not be optimal under all circumstances.

Based on applying an equal cost for all the links shown, the following tables depict optimal virtualization engine selection for each of the initiators I1 501, I2 502. and I3 503 for each VLUN based on VLUN layout and FSPF cost. It should be noted that a virtualization engine can be different for different initiators accessing the same VLUN.

According to various embodiments, each virtualization engine has access to forwarding table information that is locally populated during a port login (PLOGI) phase with an initiator and a target. In typical examples, optimal virtualization engine Selection would ensure that a copy of IO data does not pass through a given switch more than once to the extent possible.

Simple/Striped VLUNs Cases:

|    | VLUN-1 | VLUN-2 | VLUN-3 | VLUN-12 | VLUN-23 | VLUN-31 | VLUN-123 |
|----|--------|--------|--------|---------|---------|---------|----------|
| I1 | VE11/ VE12 | VE11/ VE13/ VE23/ VE22 | VE11/ VE13/ VE23/ VE24/ VE33/ VE32 | VE11 | VE11/ VE13/ VE23 | VE11 | VE11 |
| I2 | VE21/ VE23/ VE13/ VE12 | VE21/ VE22 | VE21/ VE24/ VE33/ VE32 | VE21 | VE21 | VE21 | VE21 |
| I3 | VE31/ VE33/ VE24/ VE23/ VE13/ VE12 | VE31/ VE33/ VE24/ VE22 | VE31/ VE32 | VE31/ VE33/ VE24 | VE31 | VE31 | VE31 |

Mirrored VLUNs Cases:

|    | VLUN-1 | VLUN-2 | VLUN-3 | VLUN-12 | VLUN-23 | VLUN-31 | VLUN-123 |
|----|--------|--------|--------|---------|---------|---------|----------|
| I1 | VE12 | VE22 | VE32 | VE11/ VE12/ VE13 | VE22/ VE23/ VE24 | VE11/ VE12/ VE13 | VE13 |
| I2 | VE12 | VE22 | VE32 | VE21/ VE22/ VE23 | VE21/ VE22/ VE24 | VE21/ VE23/ VE24 | VE21/ VE22/ VE23/ VE24 |

-continued

| | VLUN-1 | VLUN-2 | VLUN-3 | VLUN-12 | VLUN-23 | VLUN-31 | VLUN-123 |
|---|---|---|---|---|---|---|---|
| I3 | VE12 | VE22 | VE32 | VE22/ VE23/ VE24 | VE31/ VE32/ VE33 | VE31/ VE32/ VE33 | VE33 |

It should be noted that virtualization engine choices for simple/striped VLUN cases are not necessarily the same as mirrored-VLUN cases. A wide variety of criteria can be used to select a virtualization engine. For example, virtualization engine selection can be based on VLUN-layout, overall link-bandwidth conservation in a SAN, overall switch fabric bandwidth conservation in a SAN, virtualization engine load, etc. For cases where different virtualization engines are chosen for a given VLUN to be accessed by different initiators, a protocol to interlock and serialize write IOs to that VLUN can be used. It should be noted that the bandwidth required for write-inter-lock protocol traffic is much less than moving IO data traffic to non-optimal virtualization engines.

According to various embodiments, another aspect of optimizing virtualization engine selection involves considering the relative positions of chosen virtualization engines and making sure that it results in overall least cost for write-interlock protocol traffic.

FIG. 8 is a diagrammatic representation of one example of a fibre channel switch that can be used to implement techniques of the present invention. Although one particular configuration will be described, it should be noted that a wide variety of switch and router configurations are available. The tunneling switch 801 may include one or more supervisors 811. According to various embodiments, the supervisor 811 has its own processor, memory, and storage resources.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method comprising:
    receiving topology information for a storage area network, the storage area network associated with a virtual logical unit number (VLUN) including a plurality of host initiators, a plurality of targets, and a plurality of candidate virtualization engines;
    determining latency characteristics for performing input/output (I/O) operations between the plurality of host initiators and the plurality of targets using the candidate virtualization engines;
    determining mirroring and striping characteristics associated with the VLUN; and
    selecting a virtualization engine from the plurality of candidate virtualization engines for the VLUN based on the average latency and the mirroring and striping characteristics.

2. The method of claim 1, wherein topology information is provided using a Fabric Shortest Path First (FSPF) database.

3. The method of claim 1, wherein determining latency characteristics comprises finding the sum of distances from each of the plurality of host initiators to each of the plurality of targets using each of the plurality of candidate virtualization engines.

4. The method of claim 1, further comprising determining load associated with the plurality of candidate virtualization engines.

5. The method of claim 4, wherein selecting a virtualization engine is further based on virtualization engine load.

6. The method of claim 1, wherein the VLUN is simple, striped, or mirrored.

7. The method of claim 6, wherein sum of distances is considered when targets are mirrored.

8. The method of claim 6, wherein sum of distances and average of distances is considered when targets are striped.

9. The method of claim 1, wherein the candidate virtualization engine closest to mirrored targets is selected.

10. A system comprising:
an interface operable to receive topology information for a storage area network, the storage area network associated with a virtual logical unit number (VLUN) including a plurality of host initiators, a plurality of targets, and a plurality of candidate virtualization engines;
a processor operable to determine latency characteristics for performing input/output (I/O) operations between the plurality of host initiators and the plurality of targets using the candidate virtualization engines and determine mirroring and striping characteristics associated with the VLUN, wherein the processor selects a virtualization engine from the plurality of candidate virtualization engines for the VLUN based on the average latency and the mirroring and striping characteristics.

11. The system of claim 10, wherein topology information is provided using a Fabric Shortest Path First (FSPF) database.

12. The system of claim 10, wherein determining latency characteristics comprises finding the sum of distances from each of the plurality of host initiators to each of the plurality of targets using each of the plurality of candidate virtualization engines.

13. The system of claim 10, further comprising determining load associated with the plurality of candidate virtualization engines.

14. The system of claim 13, wherein selecting a virtualization engine is further based on virtualization engine load.

15. The system of claim 10, wherein the VLUN is simple, striped, or mirrored.

16. The system of claim 15, wherein sum of distances is considered when targets are mirrored.

17. The system of claim 15, wherein sum of distances and average of distances is considered when targets are striped.

18. The system of claim 10, wherein the candidate virtualization engine closest to mirrored targets is selected.

19. An apparatus comprising:
means for receiving topology information for a storage area network, the storage area network associated with a virtual logical unit number (VLUN) including a plurality of host initiators, a plurality of targets, and a plurality of candidate virtualization engines;
means for determining latency characteristics for performing input/output (I/O) operations between the plurality of host initiators and the plurality of targets using the candidate virtualization engines;
means for determining mirroring and striping characteristics associated with the VLUN; and
means for selecting a virtualization engine from the plurality of candidate virtualization engines for the VLUN based on the average latency and the mirroring and striping characteristics.

20. The apparatus of claim 19, wherein topology information is provided using a Fabric Shortest Path First (FSPF) database.

21. The apparatus of claim 19, wherein determining latency characteristics comprises finding the sum of distances from each of the plurality of host initiators to each of the plurality of targets using each of the plurality of candidate virtualization engines.

22. The apparatus of claim 19, further comprising determining load associated with the plurality of candidate virtualization engines.

23. The apparatus of claim 22, wherein selecting a virtualization engine is further based on virtualization engine load.

* * * * *